3,654,259
CATIONIC TRIAZOLEAZOINDOLE DYESTUFFS
Masao Iizuka, Norio Igari, and Shigeo Maeda, Tokyo, Japan, assignors to Hodogaya Kagaku Kogyo Kabushiki Kaisha, Tokyo, Japan
Filed May 15, 1969, Ser. No. 824,773
Claims priority, application Japan, May 20, 1968, 43/33,540
Int. Cl. C09b 29/36; D06p 3/52, 3/76
U.S. Cl. 260—157
8 Claims

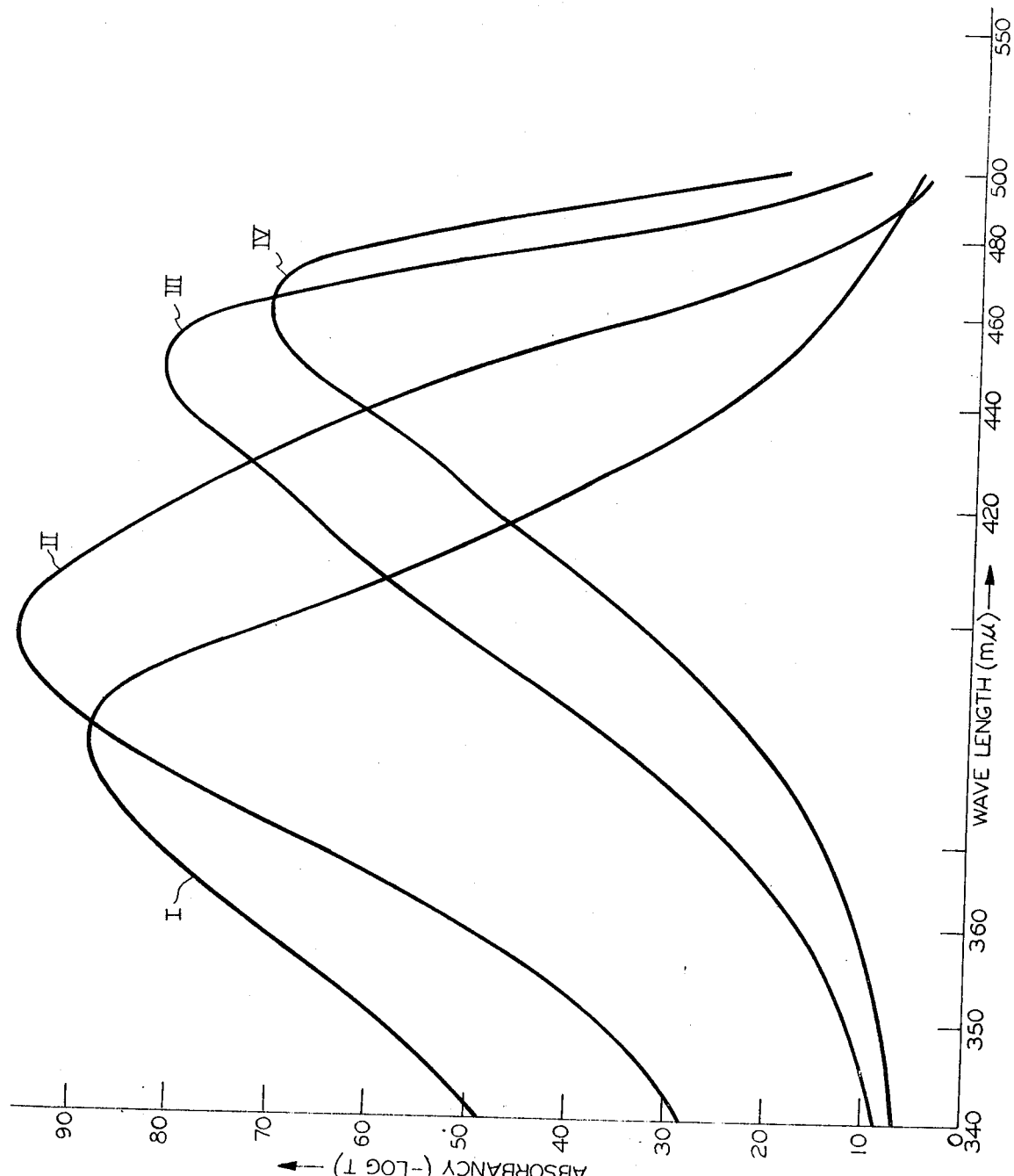

ABSTRACT OF THE DISCLOSURE

New water-soluble quaternized cationic monoazo dyestuffs represented by the general formula

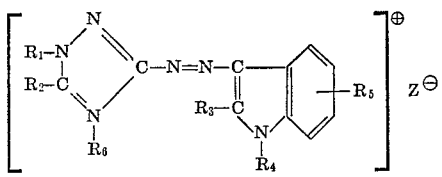

wherein $R_1$, $R_2$, $R_3$, $R_4$, $R_5$, $R_6$ and $Z^\ominus$ have the meanings respectively defined in the description and claims.

The new cationic monoazo dyestuffs are suitable for dyeing various fibrous materials such as mordant-treated cellulose fibres, acetate fibres, paper, silk, leather, synthetic fibres, especially fibres of polyacrylonitrile, polyesters and interpolymers thereof and the like. Greenish yellow to reddish yellow shades of the dyeings thus obtained are characterized by their excellent fastness to sunlight, washing, rubbing and heat and their almost complete lack of phototropism.

---

This invention relates to novel cationic azo dyestuffs and more particularly relates to novel quaternized cationic monoazo dyestuffs capable of dyeing various fibrous materials of natural and artificial sources in full and brilliant greenish to reddish yellow shades. The dyeings thus obtained are characterized by their excellent fastness properties.

The novel cationic monoazo dyestuffs of the present invention are represented by the general formula

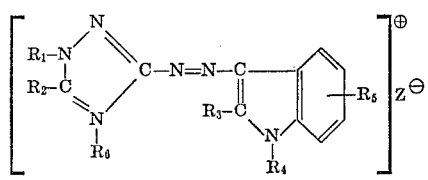

(1)

wherein $R_1$ is a member selected from the group consisting of alkyl containing up to 4 carbon atoms, benzyl and phenyl; $R_2$ and $R_4$ are each a member selected from the group consisting of hydrogen, alkyl containing up to 4 carbon atoms, benzyl and phenyl; $R_3$ is a member selected from the group consisting of alkyl containing up to 4 carbon atoms, phenyl and p-tolyl; $R_5$ is a member selected from the group consisting of hydrogen, chlorine, methyl and methoxy; $R_6$ is a member selected from the group consisting of methyl, ethyl, benzyl, carbamoyl-ethyl, the N-atom of which is either unsubstituted or substituted with ethyl, methoxyethyl and acetylethyl; and Z is an anion.

The above-defined cationic monoazo dyestuffs of the present invention may advantageously be prepared by quaternizing a monoazo dyestuff free from sulfonic and carboxylic radicals and represented by the formula

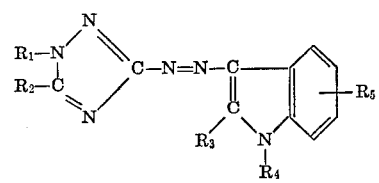

wherein $R_1$, $R_2$, $R_3$, $R_4$ and $R_5$ are as defined above, with a quaternizing agent according to conventional procedures. There are thus obtained novel, water-soluble basic monoazo dyestuffs having excellent characteristics with respect to the shades of dyeings and dyeing properties.

The quaternary ammonium monoazo dyestuffs of the present invention, as will be explained later in detail, are new triazol compounds having definite chemical structures wholly different from those of hitherto known basic monoazo dyestuffs derived from aminotriazol compounds.

It is surprising and wholly unexpected that particular triazol monoazo dyestuffs of the above-mentioned general Formula 2 used as the starting material for the quaternization according to the present invention can be prepared by diazotizing an aminotriazol compound which contains a substituent at a nitrogen atom of said triazol ring, and then coupling the resulting diazotized aminotriazol compound with an azo component capable of imparting an indol residue to the resulting triazol monoazo dyestuff of the Formula 2. Said triazol monoazo dyestuffs possess a definite chemical structure leading to formation of the quaternized ammonium compound having peculiar dyeing properties which are distinguished from those of known quaternized triazol-type basic monoazo dyestuffs.

Hitherto known quaternized triazol-type basic monoazo dyestuffs derived from known triazol azo compounds are disclosed in the specifications of British Patent Nos. 791,932, 837,471 and 938,814, for example. Among the known triazol-type monoazo dyestuffs, those prepared by coupling the diazotized amino triazol compound with an indol compound as azo component are mentioned in said British Patent No. 938,814. All these known triazol-type monoazo dyestuffs had been prepared from unsubstituted 3-amino-1,2,4-triazol or 5-substituted 3-amino-1,2,4-triazol as diazo component. There is, however, not particularly described in the British patent specifications with respect to the use of the triazol amino compound containing a substituent at nitrogen atom of the triazol ring as diazo component. It is therefore uncertain which position of the triazol ring is actually substituted with an alkyl radical when the resultant triazol monoazo dyestuff is further quaternized with, for example, an alkylating agent.

On account of its characteristic chemical structure, it is surmised that the known triazol derivative may belong to anyone of the three probable tautomers (a), (b) and (c) in Group A of the schematic formulation given in the following table.

TABLE I

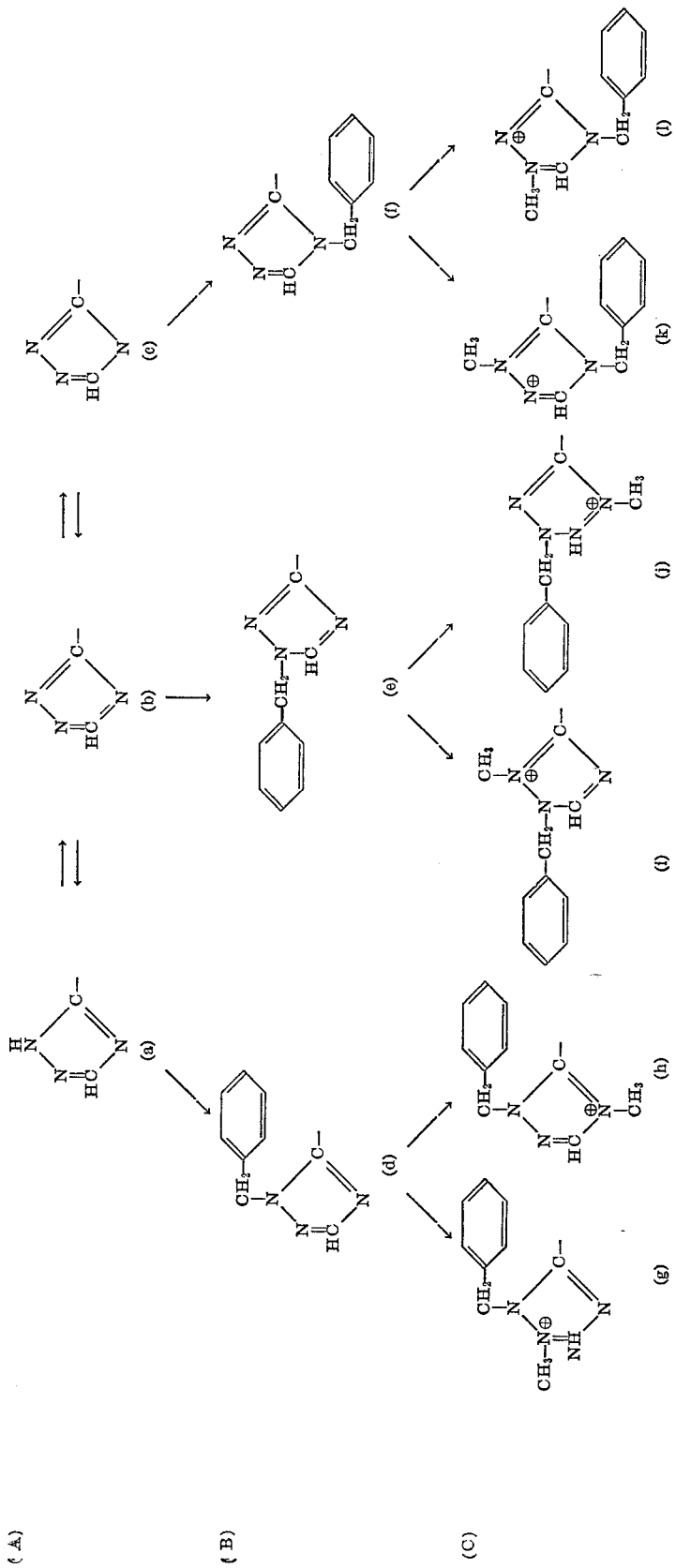

When these three isomers (a), (b) and (c) are respectively treated, for example, with one mole of benzyl chloride, there may be formed three probable isomeric compounds represented by the Formulae d, e and f of Group B in Table I, each substituted with one benzyl radical. When these isomers (d), (e) and (f) are further treated with an alkylating agent, that is, a quaternizing agent, such as dimethyl sulfate, there would probably be formed six methyl derivatives represented by the Formulae g, h, i, j, k and l of Group C in Table I.

Under the circumstances, it is uncertain which quaternary ammonium compound amongst the above-mentioned six probable ones is obtained according to the known processes, because the isomeric chemical structure of the contemplated starting material is not identified.

Since the intermediate triazol monoazo dyestuffs used for the quaternization according to the present invention, different from those used in the known processes, are derived from diazo components having definite chemical structures such as 1-substituted 3-amino-1,2,4-triazol and 1,5-disubstituted 3-amino-1,2,4-triazol, it is decisive that said intermediate monoazo dyestuffs contain a substituent such as benzyl radical at a position shown in the Formula e of Group B in Table I.

For the sake of comparison, the absorption spectra in visible region of the two benzyl-substituted intermediate triazol monoazo dyestuffs, one of which belongs to those used in the process of the present invention and the remainder belongs to those used in the known processes, are shown in the following Table II. Each of these intermediate monoazo dyestuffs was chromatographically identified as a simple substance.

cording to the present invention on polyacrylonitrile fibres is also distinguished from that of the known one. These facts hint that there is a distinct difference be-

TABLE II

| Intermediate monoazo dyestuff (I) used in the present invention | Intermediate monoazo dyestuff used in the known process |
|---|---|
| [structure with $H_2C-N$, $HC=N$, $C-N=N-C$, phenyl, $CH_3$] | Benzylation product (II) of [structure with $HN$, $HC=N$, $C-N=N-C$, phenyl, $CH_3$] |
| $\lambda_{max.}$ in pyridine = 383 m$\mu$ | $\lambda_{max.}$ in pyridine = 396 m$\mu$ |

In the accompanying drawing (FIG. 1), the absorption spectra in visible region of the intermediate monoazo dyestuffs and of the quaternary ammonium salts thereof according to the present invention are graphically shown in comparison with the absorption spectra of the corresponding intermediate monoazo dyestuffs and the quaternary ammonium salts thereof obtained by the known processes.

As is seen from the above Table II and the curves in FIG. 1, the maximum absorption in the spectra of the compound (I) used in the quaternization according to the present invention, different from that of the compound (II) used in the quaternization according to the known processes, shifts toward the region of the shorter wave lengths than that of the known compound (II). The fact hints that the chemical structure of the former compound differs from that of the latter. And, it is sure that the former compound must have the structure falling in with the Formula e of Group B in Table I, while the latter compound must have the structure falling in with either one of the Formulae d and f.

Similarly, the absorption spectra in visible region of a quaternary ammonium compound (III) obtained from the above intermediate triazol monoazo dyestuff (I) according to the present invention and of the corresponding known ammonium compound (IV) obtained from the above compound (II) according to the known processes are shown in the following Table III and in FIG. 1. These quaternary ammonium compounds were also chromatographically identified as simple substance.

TABLE III

| | Quaternary compound of the present invention | Quaternary compound of the known process |
|---|---|---|
| Structure | (III) obtained by methylation of compound (I) in Table II. | (IV) obtained by methylation of compound (II) in Table II. |
| $\lambda_{max.}$ in water | 447 m$\mu$ | 460 m$\mu$. |
| Shade on polyacrylonitrile fibres. | Yellow | Fairly reddish yellow. |

Here again, it is noted from Table III and FIG. 1 that the maximum absorption wave length in the spectra of the quaternary ammonium compound of the present invention, like those of the compound (I) in Table II and in FIG. 1, shifts toward the region of the shorter wave lengths than the maximum absorption wave length of the corresponding quaternary salt (IV) of the known azo dyestuff. The shade of the quaternized dyestuff actween the chemical structures of these two dyestuffs. It is thus believed that the dyestuffs according to the present invention should have the chemical structure corresponding to the Formula i or j of the Group C in Table I, whereas the known dyestuffs should have the chemical structure corresponding to anyone of the Formulae g, h, k and l.

Incidentally, it has been observed that azo dyestuffs obtained from 2-benzyl-3-amino-1,2,4-triazol hydrochloride melting at 241° C. which was prepared according to the article of Shirakawa, the Journal of Japanese Pharmacological Society, 80, pp. 1,550–6 (1960), unexceptionally show the same absorption spectra as those of the known azo dyestuffs. It is therefore surmised that the known intermediate monoazo dyestuff should have the Formula d of Group B in Table I, and furthermore the quaternary ammonium compound derived therefrom should naturally have either the Formula g or h. It may be concluded, taking into consideration the effect of the steric hindrance of the compounds of Group B upon a quaternizing agent that there is a probability that the compound (d) will result in the compound (h) according to the known process, while the compound (e) will result in the compound (j) according to the present invention.

The above presumption is reasonably supported by the chemical formula of the analogous compounds given in the specifications of British Patent Nos. 837,471 and 938,814, for example.

At any rate, it is obvious from the above considerations that the triazol monoazo dyestuffs in the form of quaternary ammonium salts of the present invention are new substances that are wholly distinguished from those disclosed in British Patent No. 938,814.

The intermediate triazol monoazo dyestuffs represented by the aforementioned Formula 2 which serve as starting materials for the production of the quaternized monoazo dyestuffs according to the present invention may be obtained by coupling diazotized 3-amino-1-substituted (or 1,5-disubstituted) 1,2,4-triazol in an aqueous medium with an indol derivative.

As the substitutent $R_1$ at the nitrogen atom of the aforementioned aminotriazol compound used as a diazo component for the production of the intermediate monoazo dyestuffs, there is mentioned, for example, lower alkyl such as methyl, ethyl and butyl radicals; aralkyl such as benzyl; and aryl such as phenyl radical; whereas the substituent $R_2$ at the carbon atom of the said triazol compound, there may be mentioned a hydrogen atom, lower alkyl such as methyl, ethyl and butyl radicals; aralkyl such as benzyl radical; and aryl such as phenyl radical.

The following triazol compounds, for example, may preferably be exemplified therefor:

1-methyl-3-amino-1,2,4-triazol,
1-ethyl-3-amino-1,2,4-triazol,
1-benzyl-3-amino-1,2,4-triazol,
1-benzyl-5-methyl-3-amino-1,2,4-triazol,
1-phenyl-3-amino-1,2,4-triazol,
1,5-dimethyl-3-amino-1,2,4-triazol,
1-methyl-5-benzyl-3-amino-1,2,4-triazol,
1-ethyl-5-phenyl-3-amino-1,2,4-triazol,
1,5-diphenyl-3-amino-1,2,4-triazol,
1-phenyl-5-methyl-3-amino-1,2,4-triazol,
1-benzyl-5-phenyl-3-amino-1,2,4-triazol,
1,5-dibenzyl-3-amino-1,2,4-triazol and the like.

As the substituent in the indol moiety of the coupling component that corresponds to $R_3$ in the Formula 2, there is mentioned, for example, lower alkyl such as methyl, ethyl and butyl radicals; and aryl such as phenyl p-tolyl and naphthyl radicals, and as the substituent corresponding to $R_4$, there is mentioned a hydrogen atom, lower alkyl such as methyl, ethyl and butyl radicals; aralkyl such as benzyl radical, aryl such as phenyl radical, and as the substituent corresponding to $R_5$, there is mentioned a hydrogen or chlorine atom, a nonionic substituent such as lower alkoxy lower alkyl and the like radicals.

The following indol derivatives, for example, may be exemplified as preferable: 2-methylindol, 1,2-dimethylindol, 1-methyl-2-phenylindol, 1-methyl-2-(4'-methylphenyl)indol, 1,2-dimethyl-5-chloroindol, 1,2,5-trimethylindol, 1-ethyl-2-phenylindol, 1-ethyl-2-phenyl-5-chloroindol, 1-ethyl-2-phenyl-5-methoxyindol, 2-phenylindol, 1,2-diphenylindol, 2-phenyl-5-chloroindol and the like.

The novel cationic monoazo dyestuffs of the present invention may be prepared by quaternizing monoazo dyestuffs represented by the afore-mentioned general Formula 2 in accordance with the following two procedures.

In the first procedure a monoazo dyestuff is reacted with an alkylating or aralkylating agent in an inert organic solvent such as benzene, toluene, xylene, chloroform, carbon tetrachloride, tetrachloroethane, chlorobenzene, o-dichlorobenzene, nitrobenzene, dioxane and dimethyl formamide. Instead of the inert organic solvent, there may be used an excess amount of the alkylating or aralkylating agent. As preferable alkylating or aralkylating agent, there may be mentioned esters of inorganic acid and organic sulfonic acids and alkyl halides. The following are the typical examples of such agents:

Dimethyl sulfate, diethyl sulfate, methyl ester of benzene sulfonic acid; methyl, ethyl and butyl esters of p-toluene sulfonic acid; methyl chloride, methyl bromide, ethyl iodide, ethyl bromide, benzyl chloride and the like.

Although the above-mentioned quaternizing reaction is exothermic, an external heating is required in most cases in order to initiate the reaction. The reaction is advantageously carried out at an elevated temperature.

In the second procedure of the quaternization, an addition of alpha, beta-unsaturated compound to the intermediate monoazo dyestuff molecule is carried out in a suitable solvent containing a proton-yielding substance. Solvents such as ethanol, dimethyl formamide and, in particular, formic and acetic acids may be mentioned as suitable, because these substances are capable of highly dissolving the intermediate monoazo dyestuffs. As proton-yielding substances, there may be employed not only inorganic acids such as hydrochloric, sulfuric and hydrobromic acids and the like, but also orangic acids such as glacial acetic acid, benzene and toluene sulfonic acids and the like.

As alpha, beta-unsaturated compound, there may be mentioned acrylamide, acryl N-alkylamide, methacrylamide, vinyl ketone, vinyl ether and the like, and acrylic amide is particularly preferable. Although the reaction is exothermic, it is desirable to heat the reaction system in order initiate the reaction.

The resulting quaternary monoazo dyestuffs, if they are insoluble in the employed inert solvents, will settle out. They are recovered easily by filtration. Alternatively, the solvent may be removed from the reaction mixture by vacuum distillation or steam distillation. When a solvent is employed which is miscible with water, the resulting dyestuff in the form of quaternary ammonium salt may be separated by salting out from its aqueous solution.

The quaternized cationic monoazo dyestuffs according to the present invention contain in their molecule an anion derived from, for example, hydrochloric, hydrobromic, sulfuric, benzene and toluene sulfonic acids as well as monoalkyl esters of sulfuric acid. Owing to their strongly basic nature, the colored cationic moiety of the quaternized monoazo dyestuff molecule of the present invention forms a stable salt with anion derived from a relatively weak organic acid such as formic, acetic and oxalic acids. In certain cases, hydroxy ion is also embraced in these salt-forming anions. The dyestuff salts also form a double salt with zinc chloride.

The novel quaternized ammonium monoazo dyestuffs of the present invention, in view of their chemical structure, belong to a class of basic dyestuffs of yellow color and exhibit a good solubility in water. They accordingly are adapted for dyeing papers, cellulose fibres pre-treated with a mordant such as tartar emetic and tannin; acetate fibres, silk, polyacrylonitrile, polyesters and their copolymers. Particularly, the quaternized ammonium monoazo dyestuffs of the present invention exhibit excellent dyeing properties on the fibres of polyacrylonitrile and copolymer of acrylonitrile.

In most cases, the dyeings thus obtained are highly brilliant in shades and are charactreized by a variety of the shades ranging from greenish yellow to reddish yellow. This is highly apprecaited, because there is a difficulty in production of dyestubs capable of producing such geenish yellow shades of the dyeings according to the known processes. The dyeings also show excellent fastnesses to light, washing, rubbing, heat and the like.

The different affinities of the dyestuffs of the present invention on these fibrous materials afford a variety of satisfactorily controlled dyeings ranging from dyeings of deep color to level dyeings of light color.

The following examples illustrate the invention but should not be construed as limiting the invention. In the examples, part and percent are by weight unless otherwise indicated.

EXAMPLE 1

17.4 parts of 1-benzyl-3-amino-1,2,4-triazol were dissolved in 140 parts of 60% acetic acid. To the solution were added 10 parts of 98% sulfuric acid, and the whole was cooled to −2°–0° C. At that temperature, 149 parts of nitrosylsulfuric acid derived from 7.3 parts of sodium nitrite were added drop by drop. The reaction mixture was diazotized for one hour while an excess of nitrous acid was held in the solution. After completion of the diazotization, a small amount of urea was added to the reaction mixture to decompose the remaining nitrous acid.

A solution prepared by dissolving 21.8 parts of 1-methyl-2-phenylindol in 218 parts of glacial acetic acid was poured into above diazotized solution while keeping a temperature below 5° C., and the whole was stirred for one hour.

117 parts of ammonium acetate were then added in the course of an hour, and stirring was continued for half an hour to complete the coupling. After completion of the coupling, the whole was poured into 2,000 parts of ice-water. Yellow precipitate separated out and was recovered by filtration, washed with water and dried at 70° C.

There was thus obtained a monoazo dyestuff having the formula

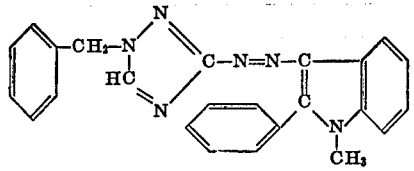

39.2 parts of this dyestuff were dissolved in 320 parts of dimethylformamide. To the solution were added drop by drop 25.2 parts of dimethyl sulfate at a temperature of 90°–95° C. The mixture was agitated at that temperature for an additional two hours to complete the quaternization. Then the mixture was poured into 3,000 parts of water followed by adding 500 parts of sodium chloride at 80° C. The yellow precipitate separated out was recovered by filtration and dried at 70° C. There were obtained 38.4 parts of a quaternary ammonium salt of the monoazo dyestuff, which was soluble in water to yield a yellow aqueous solution. From a weak acid dyebath of the dyestuff acrylonitrile fibres were dyed in a brilliant yellow shade having excellent fastness properties to light, washing, rubbing and heat.

An ethyl-quaternized monoazo dyestuff was obtained by the same procedure as that described in this example except that a corresponding amount of diethyl sulfate or ethyl ester of p-toluene sulfonic acid was substituted for the dimethyl sulfate. By using zinc chloride in addition to sodium chloride for salting out of the quaternized monoazo dyestuff, there was obtained a complex salt of zinc chloride.

Other quaternized monoazo dyestuffs having similar dyeing properties were obtained by repeating the same procedures starting from the intermediate monoazo dyestuffs listed in the following Table IV. In table, the "shade" was that of the dyeings on acrylonitrile fibres with the resulting quaternary ammonium salts of the monoazo dyestuffs.

TABLE IV
(Parts)

| Example | Monoazo dyestuff | Solvent | Quaternarizing agent | Shade |
|---|---|---|---|---|
| 2 | (31.6) | Dimethylformamid (320) | Dimethyl sulfate (25.2) | Yellow. |
| 3 | (33.4) | ...do... | diethyl sulfate (31.8) | Do. |
| 4 | (42.7) | Dioxan (320) | dimethyl sulfate (25.2) | Reddish Yellow. |
| 5 | (26.8) | Dimethylformamide (300) | Methyl p-toluenesulfonate (37.2) | Yellow. |
| 6 | (40.6) | Dimethylformamide (320) | Dimethyl sulfate (25.2) | Do. |

TABLE IV—Continued

| Example | Monoazo dyestuff | Solvent (Parts) | Quaternarizing agent | Shade |
|---|---|---|---|---|
| 7 | (structure) (42.1) | Dimethylformamide (320) | Diethyl sulfate (31.8) | Yellow. |
| 8 | (structure) (39.2) | ......do...... | Methyl p-toluene sulfonate (40.0). | Reddish yellow. |
| 9 | (structure) (42.1) | Dimethylformamide (350) | Dimethyl sulfate (25.2) | Yellow. |
| 10 | (structure) (46.9) | ......do...... | ......do...... | Do. |
| 11 | (structure) (42.1) | ......do...... | ......do...... | Do. |
| 12 | (structure) (37.8) | Dioxan (320) | ......do...... | Do. |
| 13 | (structure) (34.9) | Dimethylformamide (320). | Diethyl sulfate (31.8) | Reddish yellow. |

TABLE IV.—Continued

| Example | Monoazo dyestuff | Solvent | Quaternarizing agent | Shade |
|---|---|---|---|---|
| 14 | (structure shown, 45.5) | Dimethylformamide (300) | Dimethyl sulfate (25.2) | Yellow. |

EXAMPLE 15

18.6 parts of 1-benzyl-5-methyl-3-amino-1,2,4-triazol were dissolved in 130 parts of 80% acetic acid, and 10 parts of 98% sulfuric acid were added. The whole was cooled to a temperature of —2°–0° C. At this temperature, 149 parts of nitrosylsulfuric acid prepared with 7.3 parts of sodium nitrite were added drop by drop. By maintaining an excess of nitrous acid in the solution for one hour, the diazotization was performed. The remaining nitrous acid was decomposed by adding a small quantity of urea.

A solution was separately prepared by dissolving 13.7 parts of 2-methylindol in 137 parts of glacial acetic acid and was cooled below 5° C. which was then poured into the above diazotization mixture. After agitating the mixture for an hour, there was added 117 parts of ammonium acetate during one hour and agitation was further continued for half an hour to ensure the coupling. After completion of the coupling, the liquor was poured into 2,000 parts of ice-water. The yellow precipitate was recovered by filtration and washed with water. Upon drying at 70° C. the product, a monoazo dyestuff having the following chemical formula was obtained.

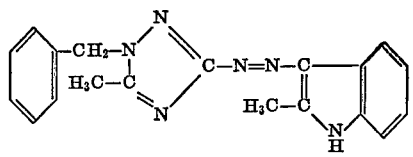

33.0 parts of the above monoazo dyestuff were dissolved in 200 parts of glyacial acetic acid. To the solution were added dropwise at a temperature of 90°–95° C. 10.6 parts of 36% hydrochloric acid followed by adding 71.1 part of acrylamide. At that temperature, the whole was stirred for 4 hours to complete the quaternization. The reaction mixture was introduced to 1,500 parts of water, stirred with a small quantity of active carbon and filtered. To the filtrate were added 15.2 parts of zinc chloride and 200 parts of sodium chloride to salting out the product. The yellow precipitate separated out was filtered and dried at 70° C.

There were thus obtained 36.8 parts of a double salt of the quaternized ammonium compound of the dyestuff with zinc chloride.

The double salt of the quaternary amomnium compound is soluble in water yielding a yellow solution. On polyacrylonitrile fibres a dyeing of brilliant greenish yellow shade was obtained from a weak acid dyebath. The dyeing possessed excellent fastness properties to light, washing, rubbing and heat.

A series of further quaternized monoazo dyestuffs having similar dyeng propertes were obtaned by carrying out the procedures similar to that above mentioned, starting from the intermediate monoazo dyestuffs listed in Table V below, wherein the "shade" was that of the dyeings on polyacrylonitrile fibres.

TABLE V

| Example | Monoazo dyestuff | Solvent | Quaternarizing agent | Shade |
|---|---|---|---|---|
| 16 | (structure shown, 31.6) | Glacial acetic acid (200) | Acrylic amide (71.1). Hydrochloric acid (10.6). | Yellow. |
| 17 | (structure shown, 39.2) | do | do | Do. |

TABLE V—Continued

| Example | Monoazo dyestuff (Parts) | Solvent | Quaternarizing agent | Shade |
|---|---|---|---|---|
| 18 | 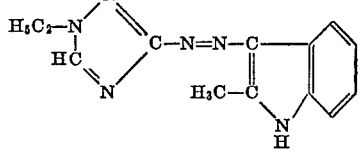 (25.4) | Glacial acetic acid (200) | Acrylic amide (71.1). Hydrobromic acid (21.2). | Greenish yellow. |
| 19 | 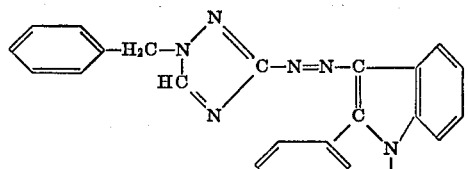 (40.6) | ____do____ | Acrylic amide (71.1). p-Toluene sulfonic acid (18.0). | Yellow. |
| 20 | 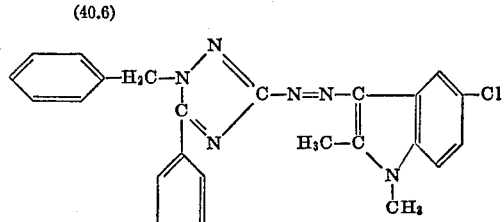 (44.2) | ____do____ | Vinyl methyl ketone (70.1). Hydrochloric acid (10.6). | Do. |
| 21 | 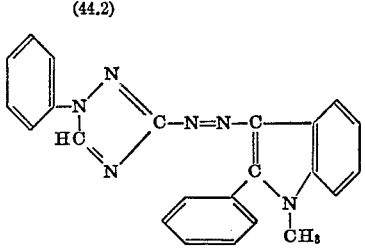 (37.8) | ____do____ | Acryl-N-ethylamide (99.1). Hydrochloric acid (10.6). | Do. |
| 22 | 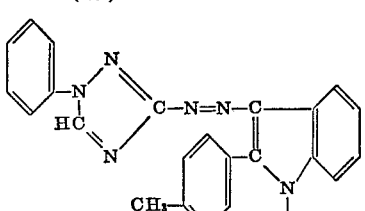 (41.8) | Formic acid (200) | Vinyl methyl ether (58.1). Hydrochloric acid (10.6). | Reddish yellow. |
| 23 | 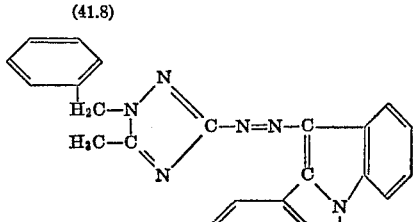 (40.6) | Glacial acetic acid (200) | Acrylic amide (71.1). Hydrochloric acid (10.6). | Yellow. |
| 24 | 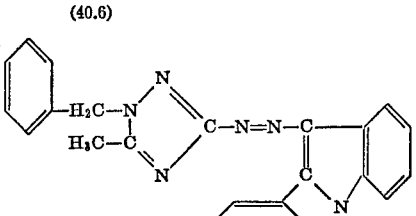 (39.2) | ____do____ | Acrylic amide (71.1). p-Toluene sulfonic acid (18.1). | Do. |

TABLE V—Continued

| Example | Monoazo dyestuff (Parts) | Solvent | Quaternarizing agent | Shade |
|---|---|---|---|---|
| 25 | [structure] (39.2) | Glacial acetic acid (200) | Acrylic amide (71.1). p-toluene sulfonic acid (18.1). | Yellow. |

EXAMPLE 26

39.2 parts of the same intermediate monoazo dyestuff as that employed in Example 1 were heated with a solution of 32.7 parts of ethyl bromide in 200 parts of ethyl alcohol under pressure to a temperature of 100°–120° C. for 5 hours. Most of the solvent was then distilled off under reduced pressure. The residue was recrystallized from water to obtain 39.0 parts of the resulting quaternary ammonium salt of the monoazo dyestuff.

The dyestuff salt thus obtained was soluble in water yielding a yellow solution.

A brilliant yellow dyeing on polyacrylonitrile fibres from a weak acid dyebath showed good fastness properties to light, washing, rubbing and heat.

By using an equivalent amount of each of methyl bromide, methyl iodide and benzyl chloride for the ethyl bromide in this example, the corresponding quaternary ammonium salts of the dyestuff having similar dyeing properties were obtained.

EXAMPLE 27

To 33.0 parts of the same intermediate monoazo dyestuff as that employed in Example 15 were added 400 parts by volume of chloroform and 25.2 parts of dimethyl sulfate. The whole was refluxed with stirring for 5 hours to complete quaternization. The reaction mixture was subjected to distillation in order to remove most of the chloroform. The residue was dissolved with heating in a mixture of 12 parts of 36% hydrochloric acid and 1,500 parts of water, shaken with a small quantity of active carbon and filtered while hot. 200 parts of sodium chloride were added to the filtrate to salt out a yellow precipitate, which was recovered by filtration and dried at 70° C. There were thus obtained 34.3 parts of the quaternary ammonium salt of the dyestuff, which was soluble in water to give a yellow solution.

From a weak acid dyebath of said dyestuff salt, polyacrylonitrile fibres were dyed in a brilliant yellow shade having excellent fastness properties to light, washing, rubbing and heat.

A series of the quaternary ammonium salts of the monoazo dyestuffs having properties similar to those above mentioned were obtained by carrying out the same procedure as that described in the above example, starting from the intermediate monoazo dyestuffs listed in the following table. In table, "shade" was that of the dyeings on polyacrylonitrile fibres.

TABLE VI

| Example | Monoazo dyestuff (Parts) | Solvent | Quaternarizing agent | Shade |
|---|---|---|---|---|
| 28 | [structure] (40.6) | Chloroform (400) | Dimethyl sulfate (25.2) | Yellow. |
| 29 | [structure] (37.4) | Benzene (400) | Diethyl sulfate (31.8) | Do. |
| 30 | [structure] (44.1) | Dichlorobenzene (400) | Ethyl p-toluene sulfonate (37.2). | Do. |

TABLE VI—Continued

| Example | Monoazo dyestuff | Solvent | Quaternarizing agent | Shade |
|---|---|---|---|---|
| 31 | (structure) (59.2) | Carbon tetrachloride (400). | Diethyl sulfate (25.2) | Yellow. |
| 32 | (structure) (40.6) | Benzene (400) | Dimethyl sulfate (25.2) | Do. |
| 33 | (structure) (40.6) | Chlorobenzene (400) | do | Do. |
| 34 | (structure) (49.2) | do | do | Do. |

The triazol amino compounds in the above examples employed as diazo component for the production of the intermediate monoazo dyestuffs to be subjected to quaternization according to the present invention are prepared by the following referential examples.

Referential Example A.—Preparation of 1-benzyl-3-amino-1,2,4-triazol 40 parts of 1-benzylaminoguanidine hydrochloride melting at 146°–147° C. were added to 60 parts of 80% formic acid. The mixture was stirred under reflux at 103° C. for one hour. The unreacted formic acid was then removed from the reaction mixture by distilling off under reduced pressure. White crystalline mass separated out was dissolved in 40 parts of water, and the solution was made alkaline by adding a sufficient amount of a 45% aqueous sodium hydroxide solution.

The white crystalline substance separated out was recovered by filtration and recrystallized from 160 parts of water. 28.2 parts of 1-benzyl-3-amino-1,2,4-triazol having a melting point of 133°–134° C. were thus obtained.

Other corresponding triazol compounds given in the following Table VII were obtained by repeating the reaction procedure of the above referential Example A starting from the substituted aminoguanidines and organic acids.

TABLE VII (Parts)

| Substituted aminoguanidine | Benzoyl chloride | Triazol amine (yield) |
|---|---|---|
| $CH_3NHNHC(=NH)NH_2 \cdot HCl$ (12.4) | HCOOH (4.6) | $H_3C-N$ ... $C-NH_2$ (8.8) |
| $C_2H_5NHNHC(=NH)NH_2 \cdot HCl$ (13.9) | HCOOH (4.6) | $H_5C_2-N$ ... $C-NH_2$ (10.1) |

TABLE VII—Continued

| (Parts) | | |
|---|---|---|
| Substituted aminoguanidine | Benzoyl chloride | Triazol amine (yield) |
| Ph—NHNHC(=NH)NH$_2$ · HCl (18.6) | HCOOH (4.6) | Ph-N-N=C(-NH$_2$)-CH=N ring (14.4) |
| CH$_3$NHNHC(=NH)NH$_2$ · HCl (12.4) | Ph-CH$_2$COOH (13.6) | H$_3$C-N-N=C(-NH$_2$)-C(CH$_2$Ph)=N (16.7) |
| Ph-CH$_2$NHNHC(=NH)NH$_2$ · HCl (20.0) | Ph-CH$_2$COOH (13.6) | Ph-CH$_2$-N-N=C(-NH$_2$)-C(CH$_2$Ph)=N (23.6) |

Referential Example B.—Preparation of 1-benzyl-5-methyl-3-amino-1,2,4-triazol 20 parts of 1-benzylaminoguanidine hydrochloride having a melting point of 146°–147° C. were dissolved in a mixture of 6 parts of glacial acetic acid and 10 parts of acetic anhydride with stirring at 70°–80° C. Acetylation was then carried out at 80°–90° C. for 2.5 hours. Upon cooling to a room temperature, 40 parts of water were added to the reaction mixture, followed by adding 25 parts of a 48% aqueous sodium hydroxide solution with stirring at 50°–60° C. A ring closure reaction was carried out at a temperature of from 95° C. to 100° C. for one hour while maintaining the alkalinity of the mixture. The reaction mixture was cooled to a room temperature, and the white crystals separated out were recovered by filtration, washed with water and dried at 70° C.

18.1 parts of 1-benzyl-5-methyl-3-amino-1,2,4-triazol having a melting point of 169°–170° C. were thus obtained.

In the similar manner, the following triazolamines were also obtained.

TABLE VIII

| (Parts) | | |
|---|---|---|
| Substituted aminoguanidine | Organic acid and acid anhydride | Triazolamino compound (yield) |
| CH$_3$NHNHC(=NH)NH$_2$ · HCl (12.4) | CH$_3$COOH (6). (CH$_3$CO)$_2$O (10). | H$_3$C-N-N=C(-NH$_2$)-C(CH$_3$)=N (10.1) |
| Ph-NHNHC(=NH)NH$_2$ · HCl (18.6) | CH$_3$COOH (6). (CH$_3$CO)$_2$O (10). | Ph-N-N=C(-NH$_2$)-C(CH$_3$)=N (15.6) |

Referential Example C.—Preparation of 1-benzyl-5-phenyl-3-amino-1,2,4-triazol 20 parts of 1-benzylaminoguanidine hydrochloride melting at 146°–147° C. were added with stirring to 40 parts of chlorobenzene at a room temperature, followed by addition of 14 parts of benzoyl chloride. The whole was heated to 110°–120° C. until an evolution of hydrogen chloride ceased. 200 parts of water were added to the reaction mixture and chlorobenzene was removed from the mixture by steam distillation.

8.3 parts of a 48% aqueous sodium hydroxide solution at 60°–70° C. were added to the mixture in order to bring the pH value of 12–14, and the whole was heated to boil with stirring for 2 hours. Upon cooling to a room temperature, a white crystalline mass separated out from the mixture which was recovered by filtration, washed with water and dried. There were thus obtained 23.4 parts of 1-benzyl-5-phenyl-3-amino-1,2,4-triazol having a melting point of 140°–141° C.

In the similar manner, there were obtained triazolamines given in the following table.

TABLE IX

| Substituted aminoguanidine | Benzoyl chloride | Triazol amine (yield) |
|---|---|---|
| H₅C₂NHNHC(=NH)(NH₂)·HCl (13.9) | ⌬-COCl (14.0) | H₅C₂-N... C-NH₂ (16.9) |
| ⌬-NHNHC(=NH)(NH₂)·HCl (18.6) | ⌬-COCl (14.0) | ⌬-N... C-NH₂ (21.2) |

What we claim is:

1. Basic monoazo dyestuff of the formula:

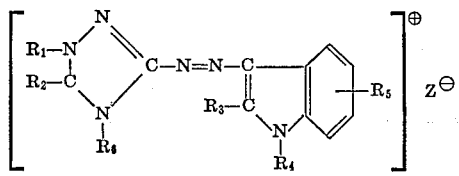

wherein $R_1$ is a member selected from the group consisting of alkyl containing up to 4 carbons, benzyl and phenyl; $R_2$ and $R_4$ are each a member selected from the group consisting of hydrogen, alkyl containing up to 4 carbons, benzyl and phenyl; $R_3$ is a member selected from the group consisting of alkyl containing up to 4 carbons, phenyl and p-tolyl; $R_5$ is a member selected from the group consisting of hydrogen, chlorine, methyl and methoxy; $R_6$ is a member selected from the group consisting of methyl, ethyl, benzyl, carbamoyl-ethyl, the N-atom of which is either unsubstituted or substituted with ethyl, methoxyethyl, and acetylethyl; and Z is an anion.

2. Basic monoazo dyestuff of the formula

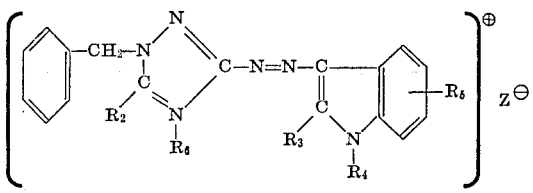

wherein $R_2$ and $R_4$ are each a member selected from the group consisting of alkyl containing up to 4 carbons, benzyl, and phenyl; $R_2$ and $R_4$ are each a member selected from the group consisting of hydrogen, alkyl containing up to 4 carbons, benzyl and phenyl; $R_3$ is a member selected from the group consisting of alkyl containing up to 4 carbons, phenyl and p-tolyl; $R_5$ is a member selected from the group consisting of hydrogen, chlorine, methyl and methoxy; $R_6$ is a member selected from the group consisting of methyl, ethyl, benzyl, carbomoyl-ethyl, the N-atom of which is either unsubstituted or substituted with ethyl, methoxyethyl and acetylethyl; and Z is an anion.

3. Basic monoazo dyestuff of the formula

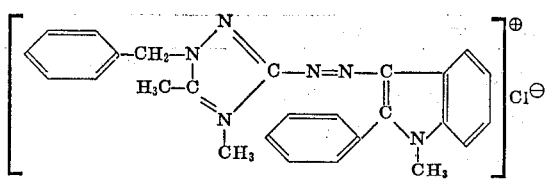

4. Basic monoazo dyestuff of the formula

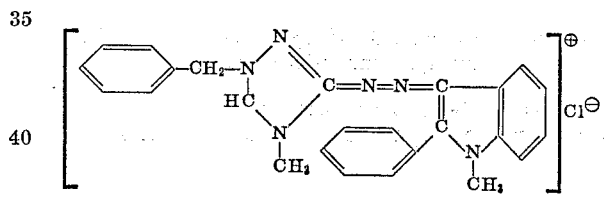

5. Basic monoazo dyestuff of the formula

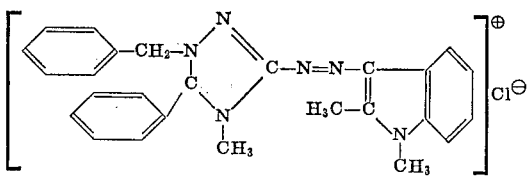

6. Basic monoazo dyestuff of the formula

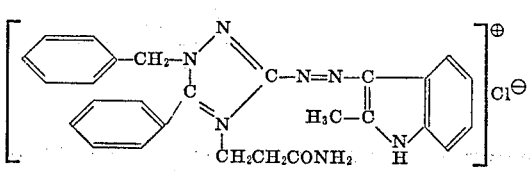

7. Basic monoazo dyestuff of the formula

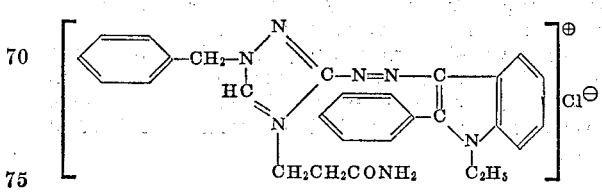

8. Basic monoazo dyestuff of the formula
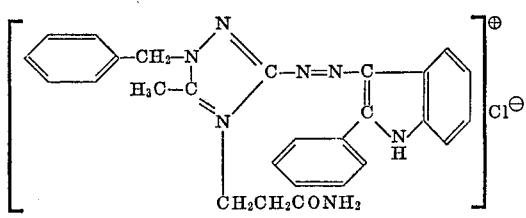
References Cited
UNITED STATES PATENTS
| | | | |
|---|---|---|---|
| 3,078,137 | 2/1963 | Baumann et al | 260—157 X |
| 3,148,935 | 9/1964 | Pfitzner et al. | 260—157 X |
| 3,255,173 | 6/1966 | Dehnert et al. | 260—157 X |
FLOYD D. HIGEL, Primary Examiner
U.S. Cl. X.R.
260—146 R, 308 R, 319.1